US011123625B2

(12) United States Patent
Stéger et al.

(10) Patent No.: US 11,123,625 B2
(45) Date of Patent: Sep. 21, 2021

(54) METHOD AND SYSTEM FOR LOCALIZATION OF BALL HIT EVENTS

(71) Applicant: Telefonaktiebolaget LM Ericsson (publ), Stockholm (SE)

(72) Inventors: József Stéger, Budapest (HU); Nóra Fenyvesi, Budapest (HU); István Gódor, Budapest (HU); Zsófia Kallus, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 72 days.

(21) Appl. No.: 16/347,842

(22) PCT Filed: Nov. 30, 2016

(86) PCT No.: PCT/EP2016/079299
§ 371 (c)(1),
(2) Date: May 7, 2019

(87) PCT Pub. No.: WO2018/099554
PCT Pub. Date: Jun. 7, 2018

(65) Prior Publication Data
US 2019/0262691 A1      Aug. 29, 2019

(51) Int. Cl.
*A63B 71/06* (2006.01)
*G01S 3/808* (2006.01)
(Continued)

(52) U.S. Cl.
CPC .......... *A63B 71/0605* (2013.01); *G01S 3/808* (2013.01); *G01S 5/22* (2013.01);
(Continued)

(58) Field of Classification Search
CPC ......... A63B 2071/0611; A63B 71/0605; G01S 3/808
See application file for complete search history.

(56) References Cited

U.S. PATENT DOCUMENTS 9,319,787 B1   4/2016 Chu
9,338,571 B2 *  5/2016 Citerin ................... G01S 3/802
(Continued)

FOREIGN PATENT DOCUMENTS

DE      9420915 U1   5/1996
GB      2457674 A    8/2009
(Continued)

*Primary Examiner* — David L Lewis
*Assistant Examiner* — Robert E Mosser
(74) *Attorney, Agent, or Firm* — Coats + Bennett, PLLC

(57) ABSTRACT

It is disclosed a method, and a system (30) capable of localizing ball hit events on a sports court. From on acoustics data acquired (22) of ball hit events by individual distributed sensors or microphones, ball hitting patterns are identified (24) in the data from each individual sensor. Based on the identified ball hitting patterns and geometric constraints of a sports court and the distribution of sensors, ball hit events are detected (26). The localization of the detected ball bit events is determined (28) based on the geometrical constraints of the sports court and the sensor distribution. The system has a number of advantages of which some are that it is cheap to install, it is non-invasive, and that it can easily be extended to provide higher precision of ball hit event localization.

20 Claims, 3 Drawing Sheets

(51) Int. Cl.
  *G01S 5/22* (2006.01)
  *G01V 1/00* (2006.01)
  *A63B 102/06* (2015.01)
(52) U.S. Cl.
  CPC .......... *G01V 1/001* (2013.01); *A63B 2102/06* (2015.10); *A63B 2220/62* (2013.01); *A63B 2220/808* (2013.01)

(56) References Cited

U.S. PATENT DOCUMENTS

| | | |
|---|---|---|
| 2003/0142210 A1 | 7/2003 | Carlbom et al. |
| 2014/0260635 A1* | 9/2014 | Leech ................ G09B 19/0038 73/645 |
| 2015/0328516 A1 | 11/2015 | Coza et al. |
| 2016/0192008 A1 | 6/2016 | Terui |

FOREIGN PATENT DOCUMENTS

| | | |
|---|---|---|
| WO | 2014005561 A1 | 1/2014 |
| WO | 2015081303 A1 | 6/2015 |

* cited by examiner

METHOD AND SYSTEM FOR LOCALIZATION OF BALL HIT EVENTS

TECHNICAL FIELD

This disclosure relates to ball hit localization. More particularly, it relates to a method and a system capable of localizing ball hit events on a sports court.

BACKGROUND

For metrics of sport analytics related to exercising of ball sports, such as squash, an important component is the location of ball hit events. It is non-trivial to achieve a sufficient resolution in time and space of measurements, in the case of a ball travelling at a high speed, in relation to the size of the ball. In addition, in order to obtain optimal real-time feed-back measurements, transports and processing of signals, minimal delays may be required. Specialized, and high cost equipment would therefore most likely be needed and such technique is not readily available.

The use of such high cost equipment is in contrast with a current general trend of using various performance metrics at large audiences.

In sports analytics, object tracking may provide information for quantitative and comparative analyses, reconstruction and possibly prediction of events, performance by players, matches, techniques, etc. Analytics techniques have become popular among a growing spectrum of audiences. Players, trainers or spectators and even amateur consumers demonstrate high interest in e.g., automated training sessions, interactive or cyber-physical and augmented reality games, spectator-engaging sport events, virtual races against historic recordings, etc. For reasons not to miss available real-time objects tracking, the focus of analytics is often primarily turned to measuring state of the players.

Another technique is to use specialized ultra-high sensitive high-resolution cameras. Others are adapted for specific ball sports, such as checking if a ball stays within the limits of the playing field in tennis. In other cases, e.g., football, the ball is large enough to place a sensor within the ball, essentially without changing properties of the ball. In yet other techniques, acoustic techniques are used for estimating the origin of audio signals. These are also techniques involving audio measurements and audio sensor setup.

In addition, there are ball tracking techniques which utilizes computer vision, line crossing scanning methods and/or sensors being provided inside a ball of a ball sports game.

These ball tracking and/or detection methods have one or more limitations:

Sensor techniques, within which sensors are placed inside a ball, require a relatively big and/or heavy ball in order not affect the properties of the ball.

Techniques using boundary crossing checking would not provide the location of a ball in three-dimensional (3D) coordinates at a sports arena.

Techniques making use of a series of infrared ports are seldom suitable for determining audio origin in ball sports in two or three dimensions, as participating player(s) may shadow the ball position when playing. Also, extended modified versions would be present high level of invasion of the playing field or sports court.

Traditional computer-vision techniques may not provide a sufficiently high frame per second resolution, for which reason specialized equipment of ultra-high-speed cameras require unreasonably high investment as setups with multi-cameras would be needed.

Moreover, ultra-high-speed recording or monitoring in facilities with multiple playing fields, and/or limited capacity for data transfer and processing computation, would most likely require various modifications.

There is thus a demand for an improved technique circumventing or at least diminishing issues when determining origin of audio signals generated in ball sports conducted at sports courts.

SUMMARY

It is an object of exemplary embodiments herein to address at least some of the issues outlined above and to localize ball hit events from acoustics data acquired at a sports court. This object and others are achieved by a system capable of localizing ball hit events on a sports court and a method for localizing ball hit events on a sports court, according to the appended independent claims, and by the exemplary embodiments according to the dependent claims.

According to an aspect, the exemplary embodiments provide a method for localizing ball hit events on a sports court. The method comprises obtaining acoustics data of ball hit events, wherein the acoustics data is collected by individual acoustic sensors of an array of acoustic sensors, where each individual acoustics sensor collects a representation of the acoustics data, and wherein the array of acoustic sensors comprises at least three acoustic sensors geometrically distributed at the sports court. The method also comprises identifying one or more ball hitting patterns from each individual representation of the acoustics data, wherein each ball hitting pattern is associated with a time stamp. The method further comprises detecting ball hit events based on the identified ball hitting patterns, their associated time stamps, and geometric constraints of the sports court and of the array of acoustic sensors. In addition, the method comprises determining the location of ball hit events on the sports court, based on the detected ball hit events, and the geometric constraints of the sports court.

According to another aspect, the exemplary embodiments provide a system capable of localizing ball hit events on a sports court. The system comprises an input module that is adapted to obtain acoustics data of ball hit events, and an analytics module that is adapted to be connected to the input module, where the acoustics data is collected by individual acoustic sensors of an array of acoustic sensors, where each individual acoustics sensor is adapted to collect a representation of the acoustics data, where the array of acoustic sensors comprises at least three acoustic sensors adapted to be geometrically distributed at the sports court. The analytics module is adapted to identify one or more ball hitting patterns from each individual representation of the acoustics data, wherein each ball hitting pattern is associated with a time stamp, to detect ball hit events based on the identified ball hitting patterns, their associated time stamps, and geometric constraints of the sports court and of the array of acoustic sensors, and to determine the location of ball hit events on the sports court, based on the detected ball hit events, and the geometric constraints of the sports court.

Examples and embodiments as described have one or more of the following advantages and preferable features:

The proposed systems are non-invasive and can be installed at already existing sports facilities with minimal disturbance of normal function.

The system is optimized to use simple and minimal equipment for high-precision measurements, and is significantly cheaper than ultra-high-speed camera solutions.

The sensor array as proposed herein may also be further extended, in terms of more sensors, all properly positioned, for high precision requirements.

It is advantageous that transfer of audio measurements or recordings has low bandwidth requirements and relatively low processing capacity requirement, enabling edge computing variation using low capacity infrastructure.

Processing of audio signal time series is advantageous for low-latency real-time feed-back systems. Also, ball hit events have simpler patterns than in visual recordings.

The proposed systems are open-ended system, simple to be integrated into local or remote sport analytics systems, including real-time techniques such as training or learning techniques or augmented reality broadcasting techniques.

BRIEF DESCRIPTION OF THE DRAWINGS

Embodiments will now be described in more detail, and with reference to the accompanying drawings, in which.

DETAILED DESCRIPTION

Figure 1:
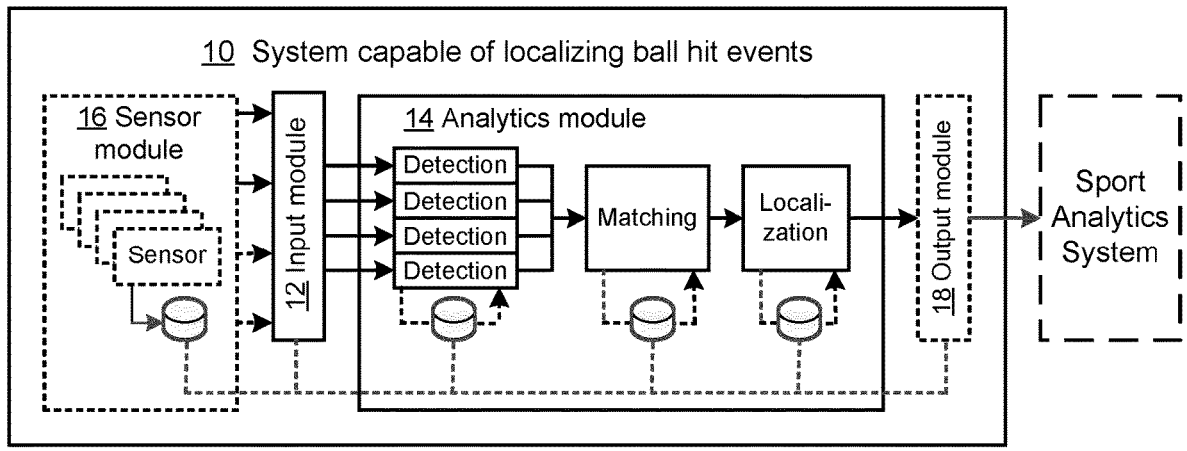
FIG. 1 schematically illustrates one embodiment of a system capable of localizing ball hit events, according to the present invention.

In the following description, exemplary embodiments will be described in more detail, with reference to accompanying drawings. For the purpose of explanation and not limitation, specific details are set forth, such as particular examples and techniques in order to provide a thorough understanding.

There is hence a demand for an improved technique circumventing or at least diminishing issues when determining origin of audio signals generated in sports conducted at sports courts. In acoustic techniques using acoustic sensors, the setup of acoustics sensors and the choice of localization method, are of importance in order to obtain localization of ball hit events on sports courts, such as squash courts and the like.

Due to relative small balls travelling at a relatively high speed, acoustic techniques from prior art are not suitable for an analytics system in for instance squash.

Embodiments of the present invention provide localization of ball hit events on wall or on racket during a sports game, such as squash, in real-time. This localization result may be used as input for sports analytics solutions when determining, for instance, entire trajectories of the ball, or the like.

It is advantageous to use a high-resolution sensor array that is suitable, or even optimized, for ball hit event measurements. A sensor array may be defined as a deployment of multiple sensors wherein each sensor position relative to the others, is defined.

Sensors are geometrically distributed on a sports court, in order to acquire acoustics data. They may advantageously also be symmetrically distributed. Especially, for sports wherein ball hits are expected to be roughly symmetrically spread over the sports court, it is advantageous to use a symmetrically distribution of sensors. On the other hand, for sports in which ball hits are expected to asymmetrically spread over the sport court, sensors may be advantageously distributed asymmetrically. The geometric distribution may thus be considered to reflect a distribution of expected ball hits on the sports court. Essentially symmetric ball hits may thus be beneficially monitored by sensors positioned symmetrically. Essentially asymmetric ball hits may thus be beneficially monitored by sensors positioned asymmetrically. Symmetrically and asymmetrically refers to being so in at least one dimension.

A system capable of localizing ball hit events may also comprise a data collector, an archiver, and a processor, be used in connection, as will be further described below.

It is preferable to fine-tune the positioning of the sensors in a two- or three dimensional space of a sports court, according to actual sports in question, to enable a low-latency timed localization of ball hit events.

Furthermore, machine learning assistance may be used for identifying one or more ball hitting patterns, for detecting ball hit events, and for determining the location of said ball hit events event.

Moreover, various computational actions herein disclosed may be executed using edge computing and/or cloud computing, as well as variations balancing between edge computing and cloud computing. Real-time feedback and long-time learning may be utilized, as will be indicated below.

Also, acoustics data of real-time ball hit events may thus be monitored, which provides a real-time localization of ball hit events.

The position of sensors of an array are advantageously distributed and optimized to certify a required measurement sensitivity of ball hit events, and thus ball hit event localization, while keeping the number of sensors used on a sports court to a minimum or at least close to a minimum. These ball hit events may involve the ball hitting a wall, the floor or a racket.

It is noted that, for cases in which a signal to noise in monitored acoustics data is relatively low, adding another sensor to the array of sensors will improve the localization of ball hit events.

The localization of ball hit events is preferably based on probabilistic results of a likelihood function. An improvement of localization may in this respect be reflected by steeper slopes of the likelihood function.

Localization results of ball hit events may furthermore be provided to an external sports analytics system. Use cases related to sports analytics, gamification and sport-broadcasting further illustrate possible extended embodiments of open-ended systems and methods.

FIG. 1 is a schematic illustration of an embodiment of a system 10 capable of localizing ball hit events, according to the present invention. The system may comprise a sensor module 12, having an array of sensors. The system further comprises an input module 14, and an analytics module 16. The system may also comprise an output module 18.

The sensor module 12 when being configured has sensors geometrically distributed on a sports court is adapted to provide measurement feeds to the analytics module 16, via the input module 14. The sensor module 12 preferably comprises configuration parameters, such as geometric properties of the sports court, and/or frequencies of measurement feeds acquired by the sensors. These configuration parameters are preferably stored in a configuration database. This is indicated in the sensor module 12.

Measurement feeds in the form of acoustics data are provided to the input module 14. Acoustics data advantageously comprises audio data, acquired by sensors such as microphones. Moreover, the acoustics data is acquired by sensors, where each sensor acquires one representation of the acoustics data, as the sensors are positioned at individual positions distributed on the sports court. Each sensor, or microphone, thus acquires one representation of the acoustics data. Each representation of the acoustics data is provided by individual channels carrying data from each of said sensors or microphones.

The input module 14 is adapted to obtain the acoustics data. This input module may be adapted to collect the acoustics data. The acquired data may comprise chunks of data for easier storage or processing. The chunks of data may be selected to be, for instance, 1 minute long acquisitions in real time. Alternatively, each chunk of data may comprise a certain number of sampled data points from the N/D conversion.

The chunks of data may have to be ordered or reordered. Also, the input module may be adapted to encode and/or decode tasks following strict timing protocols to minimize delays introduced in the measurements feeds. This may be especially advantageous for real-time data feeds.

Further, the analytics module 16 may comprise components that make use of acoustics measurements and configuration parameters to perform the following tasks: identification of ball hitting pattern per representation or channel, detection of ball hit events by matching the ball hit events, associated time stamps of each ball hitting patterns per channel, and localization of the detected ball hit events.

As described above, machine learning may be advantageously implemented for each of these components, as indicated above.

Partial and/or final location results may be saved in databases of earlier executed sports sessions, or historic databases.

Results from the analytics module 16 may be sent to the sports analytics system via the output module 18, in the form of live feeds of locations of ball hit events and timing thereof.

The location of detected ball hit events related to a sports court may form an ordered message queue having parameters such as type of ball hit event and ball player identity. Type of ball hits may comprise ball hits to the ground of the sports court or a ball hits to one or more rackets. In the case of squash game, ball hit type may comprise ball his to one or more walls.

In one embodiment of the system capable of localizing ball hit events, it implements a hyper-text transfer protocol (HTTP) based web service interface, also known as REST API, adapted to be used as a control plane. The control plane may be used for starting and stopping internal services, and for fine-tuning parameters of control logic. The control plane may also serve to retrieve state information of the system. The databases, known as historic databases, may also be made available for various future use cases and end users. As indicated above, the databases may provide basis for optional machine learning algorithms at stages of an event analytics process herein, assuring long-term amelioration of algorithmic processing performance.

Figure 2:
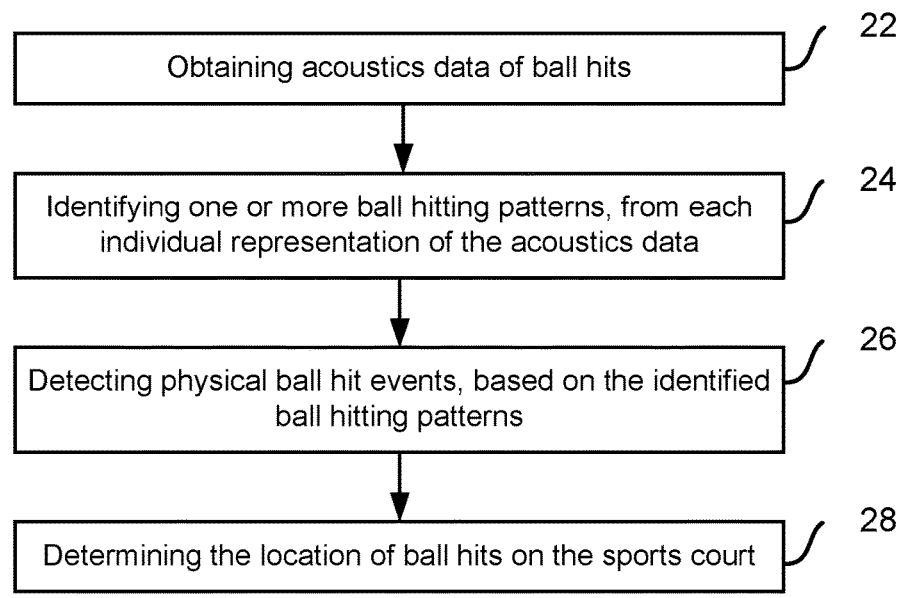
FIG. 2 illustrates a flow chart of actions in a method for localizing ball hit events.

FIG. 2 illustrates a flow chart of actions in a method for localizing ball hit events on a sports court, according to some embodiments of the present disclosure.

The flow chart comprises:

Action 22, being an action of obtaining acoustics data of ball hit events, wherein the acoustics data is collected by individual acoustic sensors of an array of acoustic sensors, and where each individual acoustics sensor collects a representation of the acoustics data, where the array of acoustic sensors comprises at least three acoustic sensors geometrically distributed at the sports court.

In action 22, obtaining acoustics data of ball hit events may comprise monitoring the acoustics data of ball hit events.

In action 22, obtaining acoustics data of ball hit events may comprise receiving the acoustics data of ball hit events from a storage of historic acoustics data.

Action 24, being an action of identifying one or more ball hitting patterns from each individual representation of the acoustics data, wherein each ball hitting pattern is associated with a time stamp.

In action 24, identifying one or more ball hitting patterns, may further comprise synchronizing the representations of the acoustics data.

In action 24, identifying one or more ball hitting patterns may be performed in parallel for each representation of the acoustics data.

Action 26, being an action of detecting ball hit events based on the identified ball hitting patterns, their associated time stamps, and geometric constraints of the sports court and of the array of acoustic sensors.

In action 26, detecting ball hit events may be based on a combination of the identified ball hitting patterns.

In action 26, detecting ball hit events may comprise matching the identified ball hitting patterns with each other.

Action 28, being an action of determining the location of ball hit events on the sports court, based on the detected ball hit events, and the geometric constraints of the sports court.

In action 28, determining the location of ball hit events on the sports court may comprise determining the location in terms of probabilities within two-dimensional planes of the sports court.

In action 28, determining the location in terms of probabilities within two-dimensional planes of the sports court may comprise determining the location in terms of three-dimensional spatial probabilities being constrained to said two-dimensional planes of the sports court.

The array of acoustic sensors may comprise three or more acoustic sensors when the sports court is formed by one flat surface, and four or more acoustic sensors when the sports court is formed by flat surfaces spanning three dimensions.

The at least four acoustic sensors geometrically distributed may enclose a volume defined by the flat surfaces spanning the three dimensions.

In actions 24, 26 and 28, machine learning, having access to historic acoustic data of ball hit events, may be used in one or more of identifying one or more ball hitting patterns, detecting ball hit events and determining the location of ball hit events on the sports court.

Ball hit events on the sports court may herein be interpreted as ball hits to the sports court, i.e. on a ground or on one or more walls of the sports court. Alternatively, or in addition, ball hit events on the sports court may herein be interpreted as ball hits to one or more rackets located in a three-dimensional space of the sports court.

The historic acoustics data of ball hit events may comprise acoustics data of ball hit events earlier acquired by individual acoustic sensors located at the sports court or at one or more other sports courts.

Figure 3:
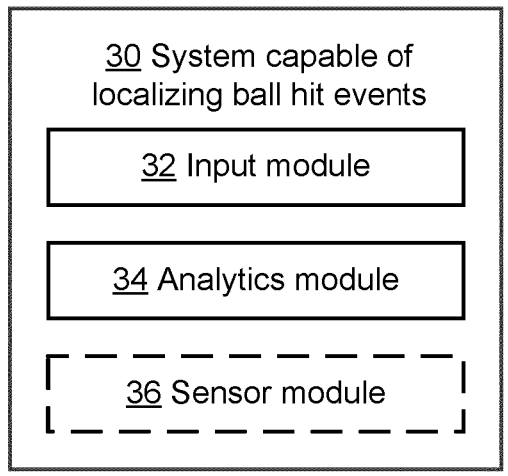
FIG. 3 schematically illustrates another embodiment of a system capable of localizing ball hit events.

FIG. 3 schematically illustrates a further embodiment of a system capable of localizing ball hit events. The system 30 that is capable of localizing ball hit events on a sports court comprises an input module 32 that is adapted to obtain acoustics data of ball hit events, where the acoustics data is collected by individual acoustic sensors of an array of acoustic sensors. Each individual acoustics sensor is adapted to collect a representation of the acoustics data, and the array of acoustic sensors comprises at least three acoustic sensors adapted to be geometrically distributed at the sports court.

The input module 32 may be adapted to monitor the acoustics data collected by the acoustics sensors individually.

The input module 32 may be adapted to receive the acoustics data of ball hit events from a memory comprising historic acoustics data.

The system 30 capable of localizing ball hit events further comprises an analytics module 34 that is adapted to be connected to the input module. The analytics module 34 is also adapted to identify one or more ball hitting patterns from each individual representation of the acoustics data, wherein each ball hitting pattern is associated with a time stamp. The analytics module 34 is adapted to detect ball hit events based on the identified ball hitting patterns, their associated time stamps, and geometric constraints of the sports court and of the array of acoustic sensors. In addition, the analytics module 34 is adapted to determine the location of ball hit events on the sports court, based on the detected ball hit events, and the geometric constraints of the sports court.

The analytics module 34 may be adapted to synchronize the representations of the acoustics data. To synchronize the representations may herein be understood as to co-ordinate or align the representations in time.

The analytics module 34 may be adapted to identify one or more ball hitting patterns in parallel for each representation of the acoustics data.

The analytics module 34 may be adapted to detect ball hit events based on a combination of the identified ball hitting patterns.

The analytics module 34 may be adapted to match the identified ball hitting patterns with each other.

The analytics module 34 may be adapted to determine the location of ball hit events in terms of probabilities within two-dimensional planes of the sports court.

The analytics module 34 may be adapted to determine the location of ball hit events in terms of three-dimensional spatial probabilities being constrained to said two-dimensional planes of the sports court.

The analytics module 34 may be adapted to use machine learning having access to historic acoustic data of ball hit events.

The array of acoustic sensors may comprise three or more acoustic sensors when the sports court is formed by one flat surface, and four or more acoustic sensors when the sports court is formed by flat surfaces spanning three dimensions. This means that when the sports court is a flat court, in for instance, tennis, at least three acoustic sensors are advantageously used. Also, when the sports court is a three-dimensional court, such as in squash for example, it is preferable to use four or more sensors or microphones.

The at least four acoustic sensors may be adapted to be geometrically distributed to enclose a volume defined by the flat surfaces spanning the three dimensions.

The memory may be adapted to comprise historic acoustics data of ball hit events earlier acquired by individual acoustic sensors located at the sport court or at one or more other sports courts.

In addition, the input module 32 and/or the analytics module 34 may be adapted to be distributed in a cloud infrastructure.

Also, the system 30 capable of localizing ball hit events may also comprise a sensor module 36 having the array of acoustic sensors.

Figure 4:
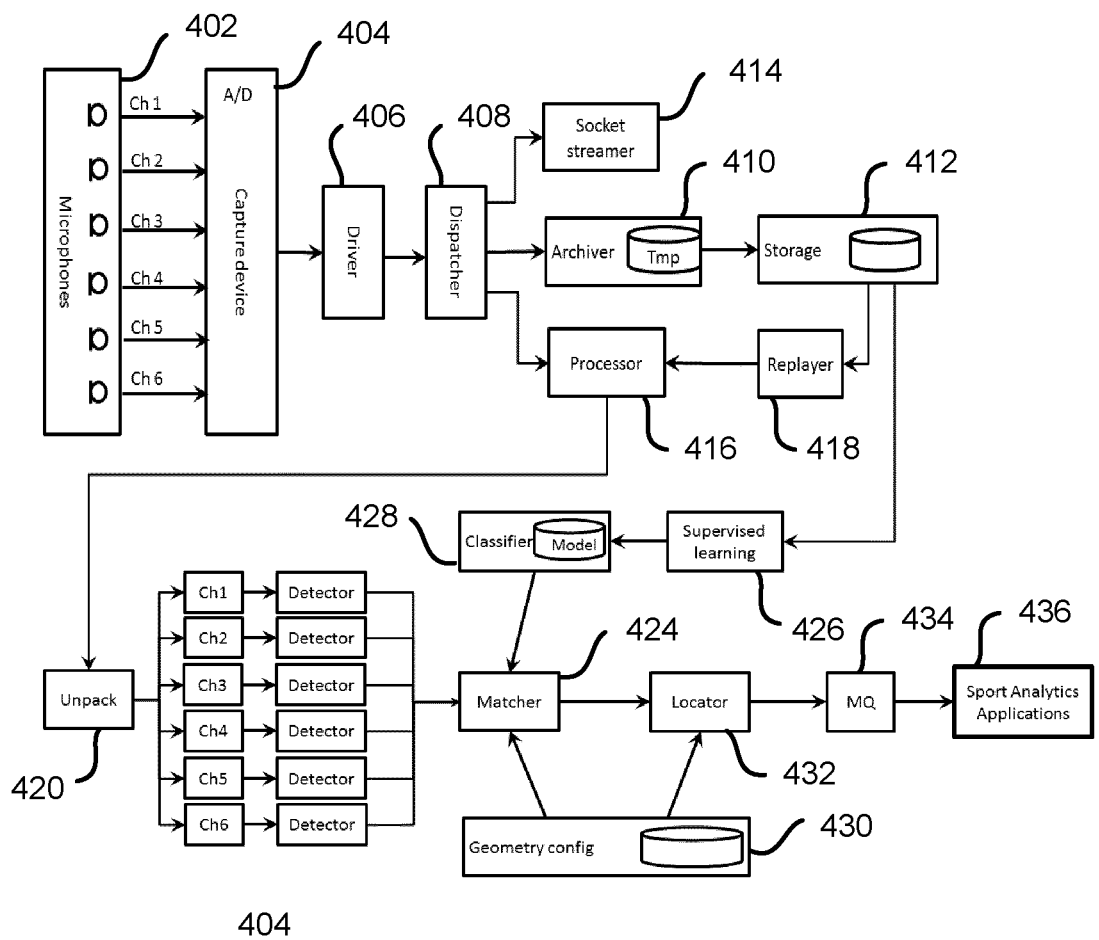
FIG. 4 illustrates yet another embodiment of a system capable of localizing ball hit events.

FIG. 4 illustrates an example of an embodiment of a system 400 capable of localizing ball hit events. This embodiment will be described together with its functions.

An array 402 of microphones comprises six high-resolution microphones, or sensors, being adapted to be positioned and installed at carefully chosen positions of a sports court, in an attempt to optimize the positions, based on the actual sport to be conducted on the sports court. As indicated above, for higher precision of localization of events, additional sensors or microphones can be included in the array, in which case the positions of each sensor or microphone would have to be changed and/or reconfigured. Geometric constraints of the array and geometric constraints of the sports court itself are stored in a geometry configuration database.

Each microphone, or sensor, acquires a raw analogue signal. Each of these signals may be considered to be representation of acoustics data of ball hit events on the sports court.

The thus acquired raw analogue signals are provided as input to a capture device 404, in which a sampler, analogue-to-digital (ND) converter and quantizer perform pre-processing and digitalization on each raw analogue signal carried each input channel.

Results therefrom form a time series of data frames, which are collected in a buffer and transmitted in chunks, via a driver 406 to a dispatcher 408. The dispatcher is adapted to further dispatch the data chunks to an archiver 410, and to a processor 416. Optionally, the dispatcher also sends data chunks to a socket streamer unit 414.

The system 400 capable of localizing ball hit events is adapted to use predefined parameters, which preferably are optimized according to the sport, the sports court and the array of sensors.

The system having these predefined parameters installed uses them in the following three different tasks in order to perform them in a timed and synchronized manner.

The socket streamer unit 414 is optional, and is adapted to provide an encoded feed of live audio or acoustics signals combined from all sensor channels to a remote processor for monitoring the sports court. The output of the socket streamer unit 414 may further support other use cases of parallel real-time analytics and the output of the socket streamer is a useful data source in algorithm development phase.

The archiver 410 is adapted to obtain files from the dispatcher 408, and to save these files in an unprocessed lossless format into a local temporary archive database of configurable length. The files may be saved in chunks of, for example, one minute in length. One example of the lossless format is the way format. Other lossless formats may be equally suitable. It is advantageous to save the files in a format without losing information that may be required by analyses to achieve a desired measurement quality or probability precision in localization of ball hit events.

The system 400 capable of localizing ball hit events is adapted to periodically push acquired a remote archive database or storage 412, to avoid overload of limited local storage capability.

The remote archive database 412 may be accessed by for example, an optional player, or replayer, unit 418 that may become a provider of a historic measurement stream of data to a processor 416. Usage of historic measurements streams of data may be of help in algorithm development phase, or other use cases.

The processor 416 is adapted to synchronize the data chunks with each other.

In an unpack unit 420 data from the processor 416 is unpacked and data for each channel is fed to a multi-channel detector 422 having a detection algorithm. The detection algorithm is run separately on the time series of each channel, in parallel.

The detector is adapted to identify one or more patterns of the acoustics data, for example to identify one or more ball hitting patterns in the acquired data. Identifying a ball hitting pattern may comprise identifying a timestamp of the ball hitting pattern. These timestamps are results from packing data into data frames, as performed by the capture device 404. Identified ball hitting patterns with timestamps derived from the frame information and an identifier of the channel in which the ball hitting pattern was identified, such as channel identity, are forwarded to a matcher unit 424.

An optional classifier unit 428 may be trained on historic (or earlier) datasets by supervised learning unit 426 for identifying a certain type of the ball hit events, for example, racket straight drive, main wall ball hit, floor ball hit, etc., or intrinsic characteristics, such as level of hit force, amount of spin to the ball, etc.

The matcher unit 424 receives the ball hitting pattern from the detecting algorithm or detector 422 for each and the associated time stamps. Based on geometric constraints, and data from each channels, the matcher unit 424 creates a list of detected ball hit events and assigns unique ball hit event identity for matched signals.

The matcher unit 424 may optionally have a filter, with which for instance only wall hits of a ball are focused on and kept.

Detected ball hit events are then forwarded a locator unit 432 that is adapted to determine the localization of detected ball hit events. The localization is derived with probability weights in a planar surface or in a 3D space.

The matcher unit 424 and the locator unit 432 take into account geometric constraints of the sports court and the constraints of the sensor or microphone array by for example, accessing the geometry configuration database 430.

A data stream comprising the results data may represent ball hit events with timestamp, two- or three-dimensional coordinates, a unique identifier and optional extra features. This stream may be fed to a message queue (MQ) 434 of ordered ball hit events. Other communication technologies to spread results data of the data stream may alternatively be applied.

Additionally, the locator unit 432 may apply projections of the results, i.e. results with a lower dimensionality, in which case, ball hit events records become a tuple of timestamp, one- or two-dimensional coordinates, a unique identifier of the ball hit event, an identifier of the projecting wall, which results may then be pushed to the MQ 434.

The message queue 434 may then be consumed by an arbitrary sports analytics system 436, as mentioned above. The sports analytics system 436 is outside the scope of this disclosure.

The present disclosure also comprises a further system that is capable of localizing ball hit events on a sports court.

The system is adapted to obtain acoustics data of ball hit events, wherein the acoustics data is collected by individual acoustic sensors of an array of acoustic sensors, where each individual acoustics sensor collects a representation of the acoustics data, and where the array of acoustic sensors comprises at least three acoustic sensors being geometrically distributed at the sports court.

The system is also adapted to identify one or more ball hitting patterns from each individual representation of the acoustics data, wherein each ball hitting pattern is associated with a time stamp.

The system is also adapted to detect ball hit events based on the identified ball hitting patterns, their associated time stamps, and geometric constraints of the sports court and of the array of acoustic sensors.

In addition, the system is adapted to determine the location of ball hit events on the sports court, based on the detected ball hit events, and the geometric constraints of the sports court.

Figure 5:
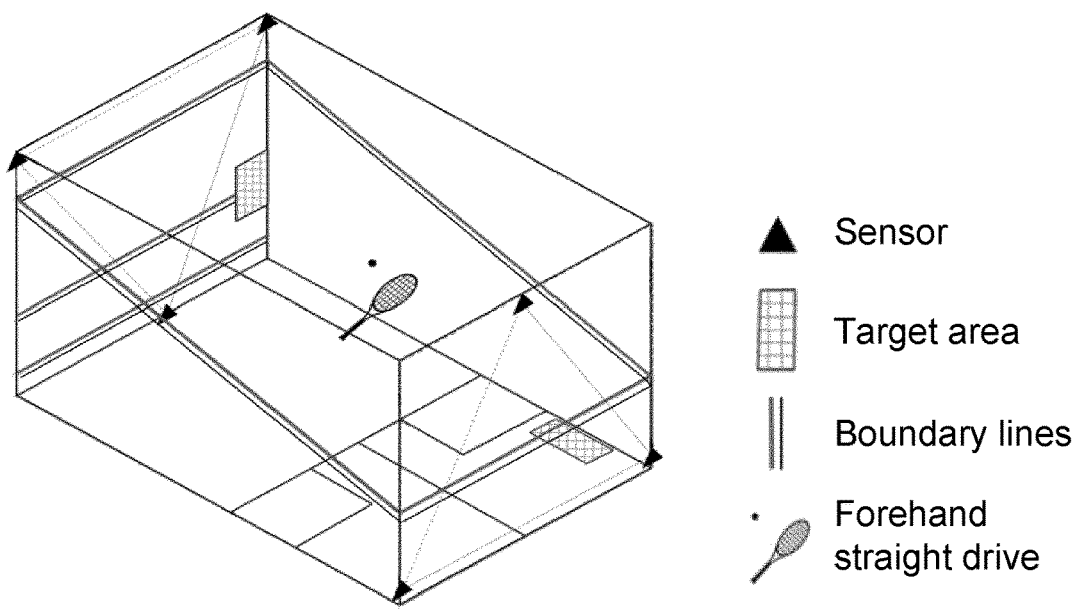
FIG. 5 illustrates one example of a sports court, to which the system capable of localizing ball hit events is applied.

FIG. 5 illustrates one example of a sports court, a squash court, at which the system capable of localizing ball hit events may advantageously be installed.

In each of the upper front and lower rear corners of the squash court, a sensor is positioned. In addition, at the centre of the main wall-floor transition and at the centre of the rear-wall—ceiling transition, one sensor is installed. In total six sensors are installed. Six sensors distributed in this way, provides a 10 cm precision localization. More sensors would increase the precision of the localization.

FIG. 5 also presents boundary lines being used in squash games. A chequered on the right hand side of the main wall in FIG. 5 indicates a target area for a forehand straight drive. Also, a chequered area at a rear right position indicates a landing location. In order to determine locations on the sports court properly, including said chequered regions, a sensor setup may be used following tetrahedron geometry with three sensors on the main-wall and three sensors on the rear-wall, of glass.

A use case may be described where performance metrics is calculated from hit locations on the main wall by a sport analytics system that also uses additional feed of player position input. This enables calculation of target areas on the main wall to reach proper landing location of the floor.

A recording rate used in the ND conversion of 96 kHz provides an optimal number of frames per second for the ball hit event detection algorithm, from FIG. 4. The sensors may use preconfigured parameters and noise filtering adapted to properties of the sports court.

A classifier unit uses a supervised neural network technique, which is trained by using a historical dataset. Using historical datasets from historic databases, enables filtering based on the type of ball hit. A locator unit is adapted to use a probabilistic method where a likelihood function is minimized and independent distance measures are used, which independent distance measures are estimated from delays of each audio sensor.

Within a system capable of localizing ball hit events, edge computing is advantageously used. Localization of ball hit events is performed on location, for instance by using the infrastructure of a sports court. Cloud infrastructure may be used for streaming localization results further to a sport analytics system and for saving audio recordings to remote archive database. By reducing data load, the output module provides real-time information for the sport analytics system where precision of ball hit localization may be part of performance metrics.

As indicated above, further embodiments of this disclosure may be customized, e.g.: more sensors for use cases where higher localization precision is required, strictly local infrastructure, scaled-out cloud infrastructure for multiple locations with common historic databases, and shared machine learning, etc. Further variation possibilities are present at the sport analytics system, where measurement feeds may be mixed with input from arbitrary additional sensor, for example, to provide feed for broadcasting or gamification solutions that combine timed ball hit event location information with synchronized measurements of player or racket sensor data, etc.

As previously noted earlier, adapted embodiments of this disclosure may be suited for various racket or ball sports.

Figure 6:
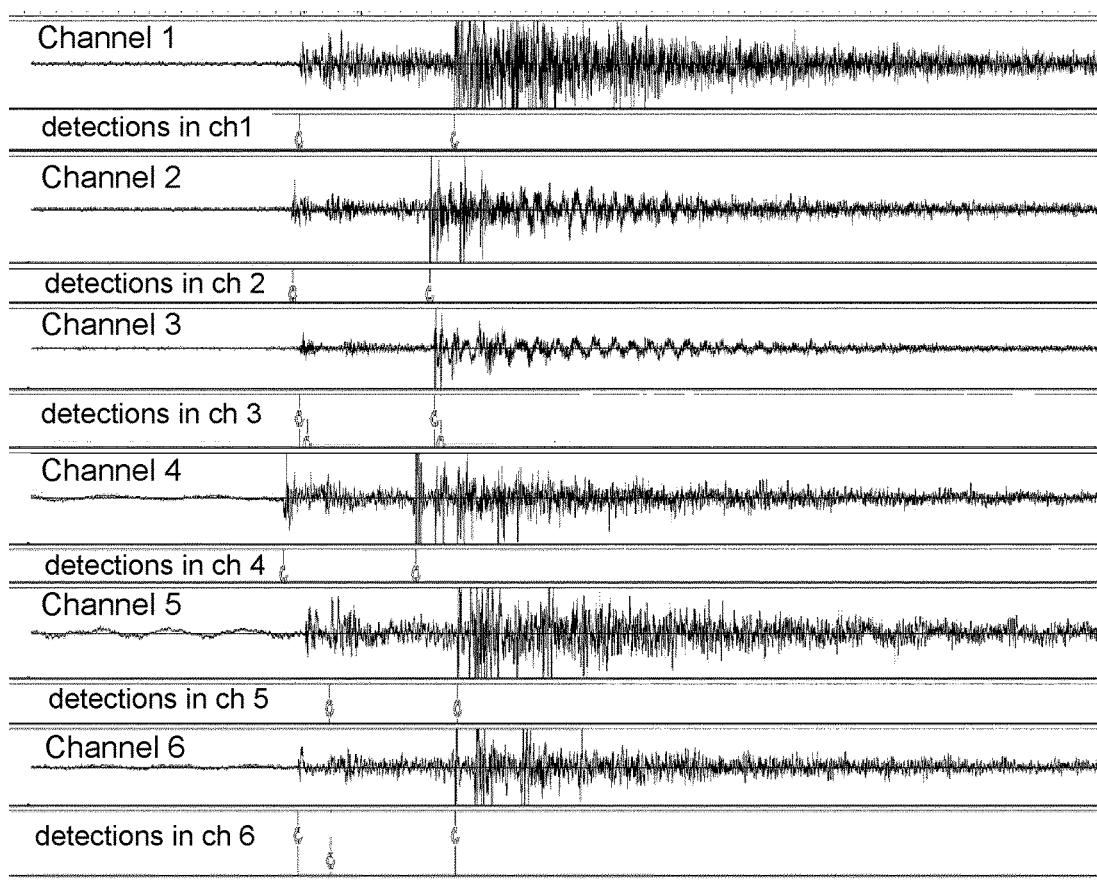
FIG. 6 presents one example of multiple representations of acoustics data of ball hit events, from the sports court as illustrated in FIG. 5, and identifications made therein, according to embodiments of the present invention.

FIG. 6 presents one example of multiple representations of acoustics data of ball hit events, from the sports court as illustrated in FIG. 5, and identifications made therein, according to embodiments of the present invention.

This example presents time series of six acoustic representations or six audio channels of data acquired by respective sensor. In addition, indications of ball hit events are also identified. These time series illustrate different delays of audio data acquired by each sensor and difference in patterns of respective type of ball hit events, i.e. when the ball hits a racket and when the ball hits the main wall, respectively.

A matcher unit may combine per channel ball hit event information to a unique combination of phase information, which detects ball hit events. A locator unit may then provide the location of the detected ball hit events, as described above.

As proposed above, the disclosure may be adapted to cloud infrastructure capitalizing on scalability and shared databases. Detection algorithms as used in the detector are inherently parallel as they are processing single sensor time series independently.

The system capable of localizing ball hit events may be used in a single sports court, and may alternatively be used in a multi-court sports arena, as processing can be scaled out similarly. Machine learning algorithms mat also benefit from common, shared historic datasets of archived raw data and processed ball hit events as well. A technique partially adapted to cloud infrastructure would keep basic processing of ball hitting pattern local, and for instance only transmit segments of signals where a ball hit event has been detected. Which actions or processing parts to process locally and which to be used in a cloud infrastructure may vary from sport to sport, and may preferably be optimized in each case of specific circumstances.

Various use cases may be envisaged. Use cases may use central, remote cloud facility involving remote location of end users such as trainers, or connected sports courts where gamified sports, such as squash, may be played by athletes or teams in separate sports courts.

Examples and embodiments as described herein have one or more of the following advantages and preferable features:

The proposed systems capable of localizing ball hit events are non-invasive and can be installed at already existing sports facilities with minimal disturbance of normal function.

The system capable of localizing ball hit events is optimized to use simple and minimal equipment for high-precision measurements, and is significantly cheaper than ultra-high-speed camera solutions.

The sensor array as proposed herein may also be further extended, in terms of more sensors, all properly positioned, for high precision requirements.

It is an advantage that transfer of audio measurements or recordings has low bandwidth requirements and relatively low processing capacity requirement, enabling edge computing variation using low capacity infrastructure.

Processing of audio signal time series is advantageous for low-latency real-time feed-back systems. Also, ball hit events have simpler patterns than in visual recordings.

The proposed system capable of localizing ball hit events is an open-ended system, simple to be integrated into local or remote sport analytics systems, including real-time techniques such as training or learning techniques or augmented reality broadcasting techniques.

It may be further noted that the above described embodiments are only given as examples and should not be limiting to the present exemplary embodiments, since other solutions, uses, objectives, and functions are apparent within the scope of the embodiments as claimed in the accompanying patent claims.

The invention claimed is:

1. A method for localizing ball hit events on a sports court, the method comprising:
   obtaining acoustics data of ball hit events;
       wherein the acoustics data is collected by individual acoustic sensors of an array of acoustic sensors;
       wherein each individual acoustic sensor collects a representation of the acoustics data;
       wherein the array of acoustic sensors comprises at least three acoustic sensors geometrically distributed at the sports court;
   identifying one or more ball hitting patterns from each individual representation of the acoustics data, wherein each ball hitting pattern is associated with a time stamp;
   detecting ball hit events based on the identified ball hitting patterns, their associated time stamps, geometric constraints of the sports court, and of the array of acoustic sensors, wherein detecting the ball hit events comprises:
       generating a list comprising the detected ball hit events; and
       assigning a unique ball hit identifier to each of the detected ball hit events on the list; and
   determining a location of a ball hit event on the sports court based on the detected ball hit events on the list, constraints of the individual acoustic sensors, and the geometric constraints of the sports court.

2. The method of claim 1, wherein the identifying one or more ball hitting patterns comprises synchronizing the representations of the acoustics data.

3. The method of claim 1, wherein the identifying one or more ball hitting patterns is performed in parallel for each representation of the acoustics data.

4. The method of claim 1, wherein the detecting ball hit events is based on a combination of the identified ball hitting patterns.

5. The method of claim 1, wherein the detecting ball hit events comprises matching the identified ball hitting patterns with each other.

6. The method of claim 1, wherein the determining the location of the ball hit event on the sports court comprises determining the location in terms of probabilities within two-dimensional planes of the sports court.

7. The method of claim 6, wherein the determining the location in terms of probabilities within two-dimensional planes of the sports court comprises determining the location in terms of three-dimensional spatial probabilities being constrained to the two-dimensional planes of the sports court.

8. The method of claim 1, wherein the obtaining acoustics data of ball hit events comprises monitoring the acoustics data of ball hit events.

9. The method of claim 1, wherein the array of acoustic sensors comprises three or more acoustic sensors when the sports court is formed by one flat surface, and four or more acoustic sensors when the sports court is formed by flat surfaces spanning three dimensions.

10. The method of claim 1, wherein obtaining the acoustics data of ball hit events comprises receiving the acoustics data of the ball hit events from historic acoustics data stored in a memory.

11. A system capable of localizing ball hit events on a sports court, the system comprising:
- an input module adapted to obtain acoustics data of ball hit events; and
- processing circuitry connected to the input module and functioning as an analytics module;
- wherein the acoustics data is collected by individual acoustic sensors of an array of acoustic sensors;
- wherein each individual acoustic sensor is adapted to collect a representation of the acoustics data;
- wherein the array of acoustic sensors comprises at least three acoustic sensors adapted to be geometrically distributed at the sports court;
- wherein the analytics module is configured to:
    - identify one or more ball hitting patterns from each individual representation of the acoustics data, wherein each ball hitting pattern is associated with a time stamp;
    - detect ball hit events based on the identified ball hitting patterns, their associated time stamps, geometric constraints of the sports court, and of the array of acoustic sensors, wherein to detect the ball hit events the processing circuitry is further configured to:
        - generate a list comprising the detected ball hit events; and
        - assign a unique ball hit identifier to each of the detected ball hit events on the list; and
    - determine a location of a ball hit event on the sports court based on the detected ball hit events on the list, constraints of the individual acoustic sensors, and the geometric constraints of the sports court.

12. The system of claim 11, wherein the analytics module is configured to synchronize the representations of the acoustics data.

13. The system of claim 11, wherein the analytics module is configured to identify one or more ball hitting patterns in parallel for each representation of the acoustics data.

14. The system of claim 11, wherein the analytics module is configured to detect ball hit events based on a combination of the identified ball hitting patterns.

15. The system of claim 11, wherein the analytics module is configured to match the identified ball hitting patterns with each other.

16. The system of claim 11, wherein the analytics module is configured to determine the location of the ball hit event in terms of probabilities within two-dimensional planes of the sports court.

17. The system of claim 16, wherein the analytics module is configured to determine the location of the ball hit event in terms of three-dimensional spatial probabilities being constrained to the two-dimensional planes of the sports court.

18. The system of claim 11, wherein the input module is configured to monitor the acoustics data collected by the acoustics sensors individually.

19. The system of claim 11, wherein the array of acoustic sensors comprises three or more acoustic sensors when the sports court is formed by one flat surface, and four or more acoustic sensors when the sports court is formed by flat surfaces spanning three dimensions.

20. The system of claim 11, wherein the input module is further configured to receive the acoustics data of ball hit events from a memory comprising historic acoustics data.

* * * * *